Dec. 9, 1958  S. M. MacNEILLE  2,864,042
SERVOMOTOR CONTROL SYSTEM
Filed Jan. 9, 1946
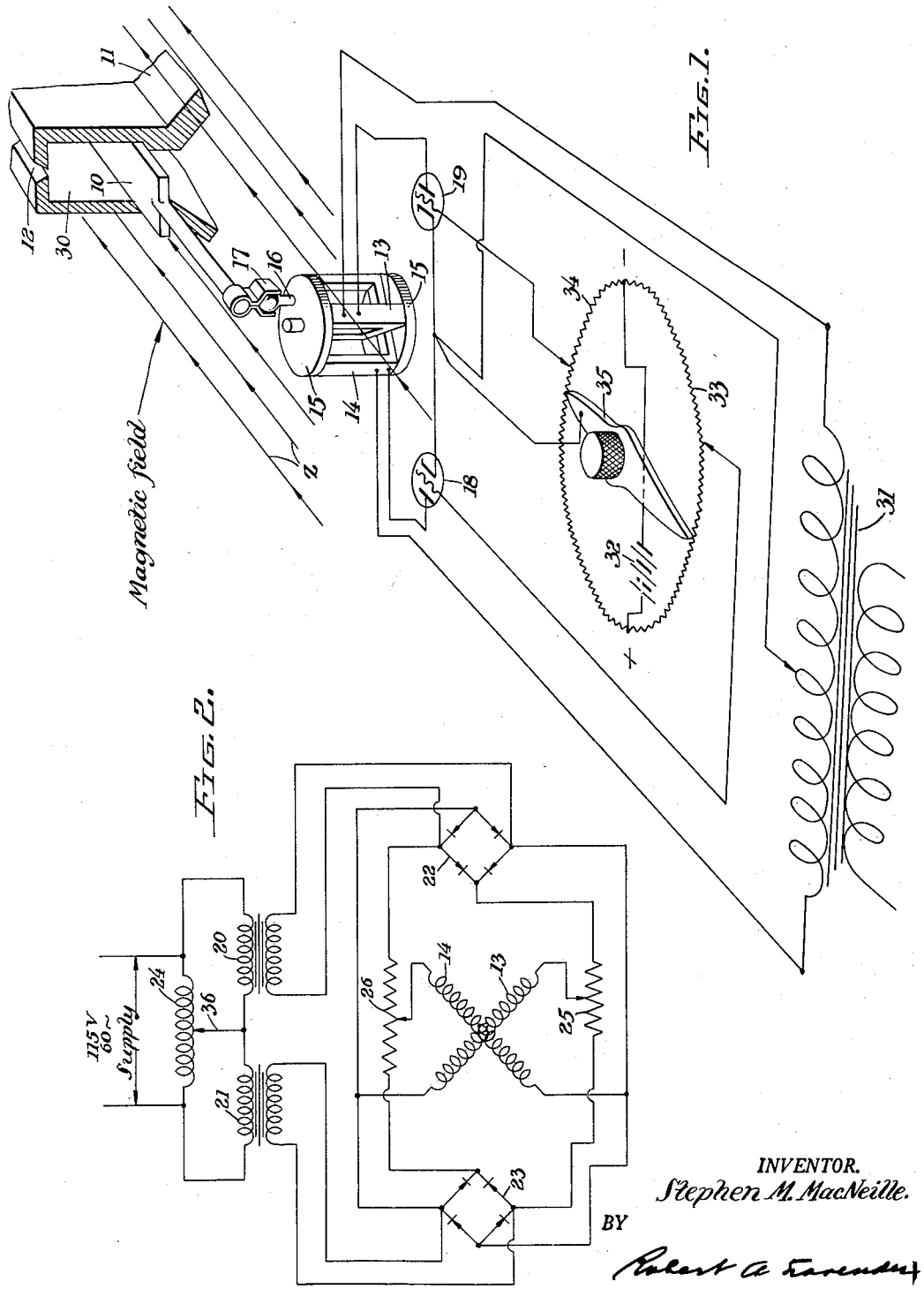
INVENTOR.
Stephen M. MacNeille.
BY

United States Patent Office 2,864,042
Patented Dec. 9, 1958

2,864,042

SERVOMOTOR CONTROL SYSTEM

Stephen M. MacNeille, Oak Ridge, Tenn., assignor, by mesne assignments, to the United States of America as represented by the United States Atomic Energy Commission Application January 9, 1946, Serial No. 640,102

5 Claims. (Cl. 318—25)

This invention relates to control systems and has for its principal object the provision of an electric motor operated vapor valve which is operable under the severe conditions existing in apparatus for electro-magnetically separating isotopes.

In the electro-magnetic separation of isotopes of a normally solid element, the element which may be in the form of a compound is vaporized in a charge chamber and fed to a region called the ionization chamber where at least a portion of the vapor is ionized. The ions are electrically removed from the vicinity of the charge chamber while the unionized vapor usually condenses on all exposed parts in the vicinity of the charge chamber. This condition coupled with the fact that for many charge materials the temperature is quite high and the operation occurs in a strong magnetic field and at a high vacuum renders difficult suitable control of the vapor.

Another object of the invention is the provision of a valve operating motor the field of which is the field of the isotope separating apparatus and the energization of which is such as to provide a dither torque for producing a small amplitude oscillation to eliminate the effect of static friction.

Another object of the invention is the provision of a control circuit for a positional electric motor which will function to supply positioning torque current and dither torque current in such a way that the dither torque will be constant for all positions of the motor.

Other objects and advantages of the invention will be evident from the following description when read in connection with the accompanying drawing in which:

Fig. 1 shows diagramatically a vapor valve arranged to be actuated by a motor in accordance with the invention; and Fig. 2 shows schematically the preferred motor control circuit of the invention.

To illustrate the invention there is shown in Fig. 1 a butterfly type valve 10 positioned in the throat of a charge container 11 having the usual ionization chamber 30 and a slit 12 through which ionized vapors pass in a well known manner. It is desired to provide an electric motor for operating the valve 10 and a suitable arrangement includes two coils 13 and 14 mounted mutually perpendicular on supporting plates 15 which are rotatably mounted in any suitable manner (not shown). In apparatus of this type the axis of the valve 10 and the slit 12 are parallel with the lines of force of a magnetic field Z, as shown, and hence the axis of rotation of the armature coils 13 and 14 must be perpendicular to the axis of rotation of the valve 10 in order to utilize the magnetic field Z as the field for the motor armature comprising coils 13 and 14.

In the present embodiment, angular motion of the armature coils 13 and 14 is translated into angular motion of the valve 10 through a pin 16 carried by the upper plate 15 and a channeled crank 17 secured to the valve 10. With this arrangement the angular position of the armature coils 13 and 14, and hence the position of the valve 10 depends upon the direct currents flowing in the coils 13 and 14 and can be varied by changing the ratio between such currents. Two of the many circuit arrangements are shown in the drawing. Both circuits provide for dither current i. e., a small amplitude oscillation to eliminate the effects of static friction.

As shown in Fig. 1 the two armature coils 13 and 14 are supplied with alternate pulses of direct current through vacuum tubes 18 and 19 functioning as half-wave rectifiers of alternating current from a suitable source such as a transformer 31. A battery 32 and two potentiometers 33 and 34 having a common adjustable contact 35 make it possible to vary differentially the voltages on the grids of the tubes 18 and 19 to produce a corresponding variation in the current pulses passed by the tubes 18 and 19. Thus by adjustment of the contact 35 the torque and therefore the angular position of the coils 13 and 14 and of the valve 10 can be adjusted as desired.

The pulses passed by the tubes 18 and 19 alternate with one another to provide the desired dither but with the disadvantage that this dither torque varies as the sine of $2\theta$ where $\theta$ is the equilibrium angle between one of the coils, 13 or 14, and the direction of the magnetic field. Thus the dither torque goes to zero as either coil 13 or 14 approaches being parallel to the magnetic field and is maximum when both coils are at 45 degrees with respect to the magnetic field.

In the preferred embodiment of the invention illustrated in Fig. 2 the above disadvantage with respect to dither is overcome by using full wave rectification for supplying the torque currents and a superimposed alternating current for providing the desired dither.

As shown in Fig. 2 the coils 13 and 14 are, respectively, furnished direct current from a transformer 20 via a rectifier 22 and a transformer 21 via a rectifier 23. The coils are so connected that the coil 13 receives alternating current from the transformer 21 and the coil 14 receives alternating current from the transformer 20. The transformers 20 and 21 are connected to a suitable alternating current source through an autotransformer 24 having an adjustable tap 36 for varying the ratio of the alternating currents in the coils 13 and 14 and at the same time but in an inverse manner the ratio between the direct currents in the coils 13 and 14. It is thus evident that the A. C. in each of the coils 13 and 14 varies inversely with the D. C., and the A. C. in one coil is opposite in phase to the A. C. in the other coil as determined by the direction of the D. C. in the two coils.

With the above arrangement the A. C. or dither magnetic vector is always at a right angle to the D. C. or torque magnetic vector and the relation between the two is independent of the orientation angle $\theta$. If the magnitude of the D. C. vector is made constant then the magnitude of the A. C. vector will be constant and the dither torque will be constant for all values of $\theta$.

For convenience, the coils 13 and 14 are provided with associated rheostats 25 and 26, respectively, the adjustment of which controls the ratio of A. C. to D. C. in each coil, i. e., the ratio between the dither torque and the positioning torque.

Although the invention has been described in connection with a vapor valve, it is to be understood that it is not limited thereto but has the scope of the appended claims.

I claim:

1. Means for controlling the angular position in a magnetic field of a rotor comprising two coils mounted mutually perpendicular, comprising a first source of alternating current connected to one of the rotor coils, a full wave rectifier between said first source and the other of the rotor coils, a second source of alternating current opposite in phase to said first source and connected to said other of the rotor coils, a full wave rectifier between said second source and said one of the rotor coils, and means for varying differentially the energy supplied the two sources of alternating current whereby the ratio between the alternating currents in the two rotor coils is varied and in an inverse manner the ratio betwen the rectified currents in the two rotor coils is varied.

2. The means as claimed in claim 1 in which an impedance in the circuit of each coil is adjustable to vary the ratio between the alternating current and the direct current in each coil.

3. A circuit network for energizing a motor armature having a pair of windings arranged at right angles to one another, comprising a pair of rectifiers each having input and output terminals, the input terminals of each rectifier being connected to the output terminals of the other rectifier, one of the armature windings being connected across the output terminals of one of the rectifiers and the other armature winding being connected across the output terminals of the other rectifier, means for supplying alternating current to the input terminals of said rectifiers, and means for varying differentially the alternating currents supplied to said input terminals, whereby in each armature winding the direct current varies inversely with variations in the alternating current.

4. In an apparatus for controlling the angular position in a magnetic field of a rotor comprising two coils mounted mutually perpendicular, comprising a first source of alternating current connected to one of the rotor coils, a full wave rectifier between said first source and the other of the rotor coils, a second source of alternating current opposite in phase to said first source and connected to said other of the rotor coils, a full wave rectifier between said second source and said one of the rotor coils, and a power supply including a winding having an adjustable tap and connections to the said alternating current sources, the connection to the adjustable tap being common to both sources so that by adjusting it the energy supplied to the two current sources is varied differentially to vary the ratio between the alternating currents in the two rotor coils and in an inverse manner the ratio between the rectified currents in the two rotor coils.

5. In an electromagnetic mass separator including a vapor chamber communicating with an ion source chamber through a valve and disposed within a magnetic field, means for positioning said valve comprising an armature having a pair of windings arranged at right angles to one another, said armature being rotatably mounted within said field and axially perpendicular thereto; a pin carried by said armature and radially displaced from its axis; a channeled crank connecting said valve with said pin for translating the angular motion thereof to angular rotation of said valve; means for supplying both direct current and alternating current simultaneously to both of said windings; and means for providing constant dither torque at all positions of said armature, comprising means for simultaneously and differentially varying the magnitudes of the direct and alternating currents in each winding in inverse sense.

References Cited in the file of this patent

UNITED STATES PATENTS

| | | |
|---|---|---|
| 798,236 | Usener | Aug. 29, 1905 |
| 1,684,042 | Methlin | Sept. 11, 1928 |
| 2,227,474 | Weathers | Jan. 7, 1941 |
| 2,275,317 | Ryder | Mar. 3, 1942 |